(12) United States Patent
Salzer et al.

(10) Patent No.: US 10,672,084 B2
(45) Date of Patent: Jun. 2, 2020

(54) METHOD AND SYSTEM FOR INTEGRATING AN ENTERPRISE APPLICATION WITH A SOCIAL NETWORKING APPLICATION

(71) Applicant: Oracle International Corporation, Redwood Shores, CA (US)

(72) Inventors: Daniel Salzer, Piedmont, CA (US); Vaibhav Lole, Pleasanton, CA (US); Indira Lakshmi Vidyaprakash, San Francisco, CA (US); Reza Ardeshir Rokni, Oxhey Hall (GB)

(73) Assignee: Oracle International Corporation, Redwood Shores, CA (US)

( * ) Notice: Subject to any disclaimer, the term of this patent is extended or adjusted under 35 U.S.C. 154(b) by 1486 days.

(21) Appl. No.: 13/888,888

(22) Filed: May 7, 2013

(65) Prior Publication Data

US 2013/0325733 A1    Dec. 5, 2013

Related U.S. Application Data

(60) Provisional application No. 61/643,801, filed on May 7, 2012, provisional application No. 61/777,387, filed on Mar. 12, 2013.

(51) Int. Cl.
*G06Q 10/10* (2012.01)
*G06Q 50/00* (2012.01)
*G06Q 10/06* (2012.01)

(52) U.S. Cl.
CPC .......... *G06Q 50/01* (2013.01); *G06Q 10/06* (2013.01); *G06Q 10/10* (2013.01)

(58) Field of Classification Search
CPC .................................................. G06Q 10/00
USPC .......................................... 705/1.1; 709/204
See application file for complete search history.

(56) References Cited

U.S. PATENT DOCUMENTS

| | | | |
|---|---|---|---|
| 2009/0222448 A1* | 9/2009 | Caldwell | G06Q 10/10 |
| 2012/0198067 A1* | 8/2012 | Weiss | G06Q 10/00 |
| | | | 709/226 |
| 2013/0097320 A1* | 4/2013 | Ritter | G06Q 10/06 |
| | | | 709/226 |
| 2013/0132864 A1 | 5/2013 | Panigrahi et al. | |
| 2013/0166721 A1* | 6/2013 | Soffer | H04L 51/32 |
| | | | 709/224 |
| 2014/0082070 A1 | 3/2014 | Chakraborty et al. | |
| 2014/0164055 A1 | 6/2014 | Knight et al. | |

* cited by examiner

*Primary Examiner* — Sangeeta Bahl
(74) *Attorney, Agent, or Firm* — Vista IP Law Group, LLP

(57) ABSTRACT

Disclosed is an approach for integrating one or more enterprise applications with a social networking application. Integration is provided between a CRM application and the social networking application.

25 Claims, 13 Drawing Sheets

METHOD AND SYSTEM FOR INTEGRATING AN ENTERPRISE APPLICATION WITH A SOCIAL NETWORKING APPLICATION

CROSS-REFERENCE TO RELATED APPLICATIONS

The present application claims the benefit of priority to U.S. Provisional Application No. 61/643,801, filed on May 7, 2012, and U.S. Provisional Application No. 61/777,387, filed on Mar. 12, 2013, which are hereby incorporated by reference in their entirety.

BACKGROUND

Many businesses and organizations employ one or more business applications, and in some cases, suites of business applications, to provide visibility and control over various aspects of the business. Such "business applications" (or, as they are sometimes called, "enterprise applications") can include, without limitation, customer relations management ("CRM") applications, enterprise resource planning ("ERP") applications, supply chain management applications, and other applications dealing with various finance, accounting, manufacturing, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, Calif.

For many of these enterprise/business applications, it would be very useful to be able to provide an effective mechanism to allow users of the system to interact and collaborate with each other. For example, consider the CRM application, which is designed to facilitate the ability of a business to create, develop, and build relationships with its customers or potential customers—with the obvious intent to obtain or increases the business' sales to the customers. In this type of system, it would be very desirable to allow the users to stay informed and collaborate for related business activities and customers/leads.

SUMMARY

The present disclosure is directed to an approach for integrating one or more enterprise applications with a social networking application. According to some embodiments, integration is provided between a CRM application and the social networking application.

Other and additional objects, features, and advantages of the invention are described in the detailed description, figures, and claims.

DETAILED DESCRIPTION

Figure 1A:
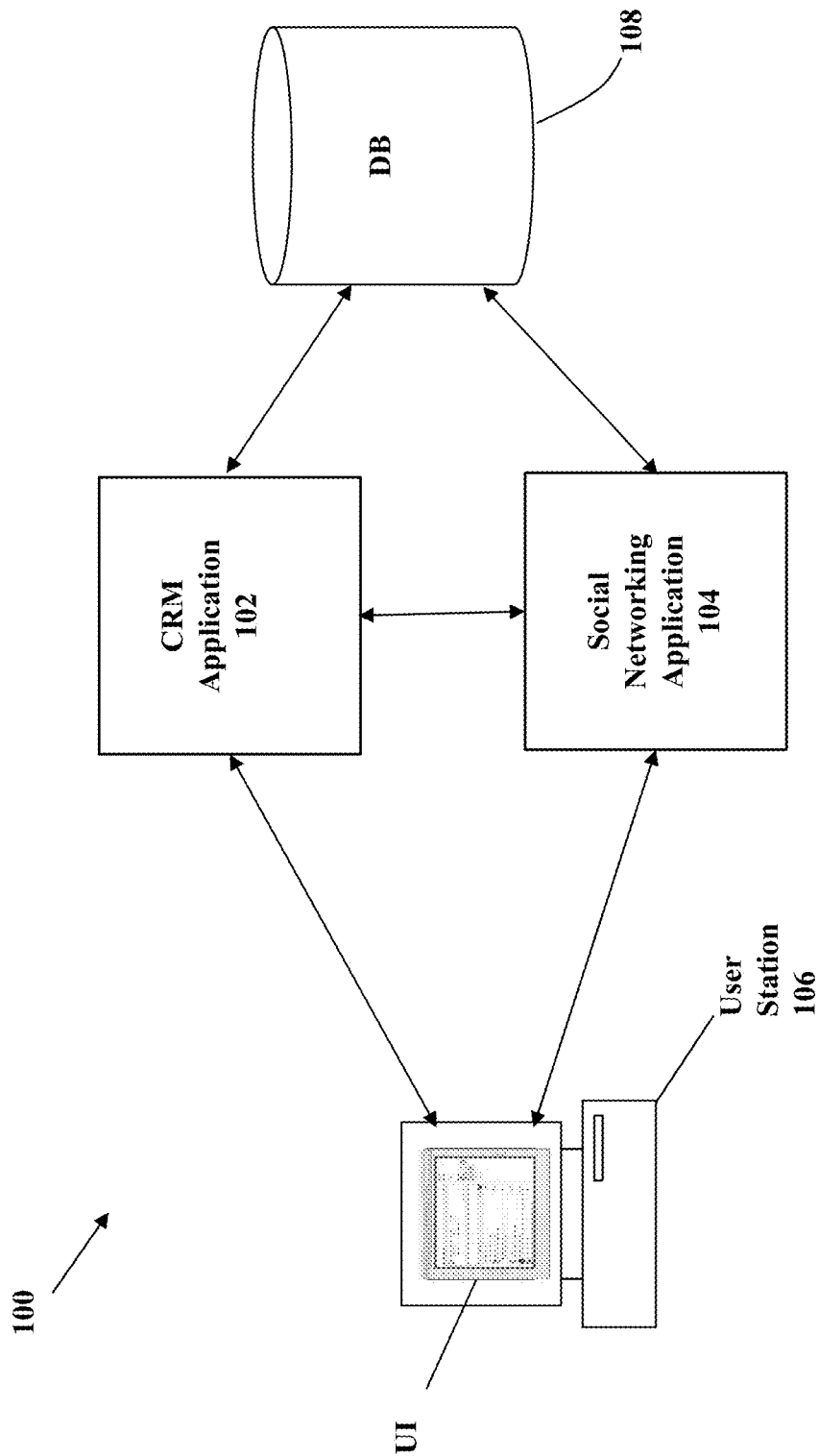
FIG. 1A depicts an example system or integrating an enterprise application with a social networking application.

The present disclosure is directed to an approach for integrating one or more enterprise applications with a social networking application (also referred to herein as a social media application). According to some embodiments, integration is provided between a CRM application and the social networking application. This approach advantageously provides for real-time collaboration between individuals and teams within and across enterprises with a broad range of social tools that seamlessly integrate business processes, activities, and enterprise.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrative embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

According to some embodiments, integration is provided between a CRM application and the social networking application. For the purposes of explanation, one or more embodiments are illustratively described with reference to CRM applications. It is noted, however, that the invention may be applied to other types of enterprise applications as well, and is not to be limited to CRM applications unless explicitly claimed as such.

FIG. 1 illustrates an example system 100 which may be employed in some embodiments of the invention to implement integration of a CRM application 102 and a social networking application 104. The system 100 includes one or more users at one or more user stations 106 that operate the system 100 to operate the CRM application 102, the social networking application 104, and/or an integrated version of the two applications. The user station 102 comprises any type of computing station that may be used to operate or interface with the applications in the system 100. Examples of such user stations 102 include for example, workstations, personal computers, or remote computing terminals. The user station 102 comprises a display device, such as a display monitor, for displaying a user interface to users at the user station 102. The user station also comprises one or more input devices for the user to provide operational control over the activities of the system, such as a mouse or keyboard to manipulate a pointing object in a graphical user interface to generate user inputs to the CRM application 102 and/or social networking application 104.

The data operated upon by the CRM application 102 and/or social networking application 104 may be stored in a computer readable storage device 108. The computer readable storage device 108 comprises any combination of hardware and software that allows for ready access to the data that is located at the computer readable storage device. For example, the computer readable storage device 108 could be implemented as computer memory operatively managed by an operating system. The computer readable storage device 108 could also be implemented as an electronic database system having storage on persistent and/or non-persistent storage. The computer readable storage device 108 may be shared as shown in FIG. 1 or on discrete servers that are not shared between the CRM application and the social networking application.

The social networking application 104 comprises an application for implementing social networking services and functionality. The social networking application in the present embodiment facilitates social interactions within the enterprise environment (as opposed to a social networking/media application in the consumer environment) connecting people, applications and business processes within and across businesses. The social network includes user profiles, conversations, and social objects. A "conversation" in the social network in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network. Posts within a conversation are viewed with new posts beneath old posts (i.e., multiple posts can be read as text on a page in a book), or vice versa, or in any type of hierarchical format.

For the purposes of illustration, the following explanation is being made in the context of a specific social networking application (the "Oracle Social Network" or "OSN"). It is noted however, that the invention is not limited to this specific social networking application, and is applicable to other social networking applications as well. Therefore, any reference to "OSN" or "Oracle Social Network" made herein is merely illustrative of a social network that may be employed in conjunction with some embodiments of the invention. Information regarding an example social network implementation that may be used in conjunction with the present invention is described in co-pending U.S. application Ser. No. 13/622,071, filed on Sep. 20, 2012, entitled "Social Network System with Social Objects", which is hereby incorporated by reference in its entirety.

In some embodiments, the social networking application comprises a secure enterprise collaboration and social networking solution for business purposes. The social networking application facilitates real-time collaboration between individuals and teams within and across enterprises with a broad range of social tools that seamlessly integrate business processes, activities, and enterprise. With the integration of the social networking application and enterprise applications, users are able to stay informed of business activities and drive productivity with purposeful social networking.

Social objects are objects that are shared between the social network and the CRM/enterprise application to provide integration between these two applications. The social objects include sufficient information to carry information that can usefully permit one application to work with the other. For example, the details pertaining to a sales/marketing business object within the CRM application may be passed as a social object to the social networking application so that the tools within the social networking application (e.g., conversation tool) can display and act upon the CRM information.

Any suitable type of social object may be integrated using the present mechanism/process. For example, people interaction may be implemented/facilitated through the social object's data exposed through the social network. Process details (e.g., Business Process Management or BPM), people interaction, sales, and/or KPI (key performance indicator) definition or threshold are examples of data that may be provided using the social objects.

In addition, data exposed by the social object should be useful and/or valuable for multiple users (e.g., all users or at least a set of users). Examples of such useful information include sales/customer information such as revenue or contact information. In addition, an organization may find it useful to share leads or marketing campaign information. Other information such as HR data (e.g., goals and benefits data in a human resources application) may also be candidates for sharing and collaboration through social objects.

The integration of the social objects may provide numerous benefits to the user/company. For example, this approach allows for sharing of useful information/data. In addition, this permits a single space of collaboration for a given topics. Moreover, this approach simplifies and enhances people communication.

Figure 1B:
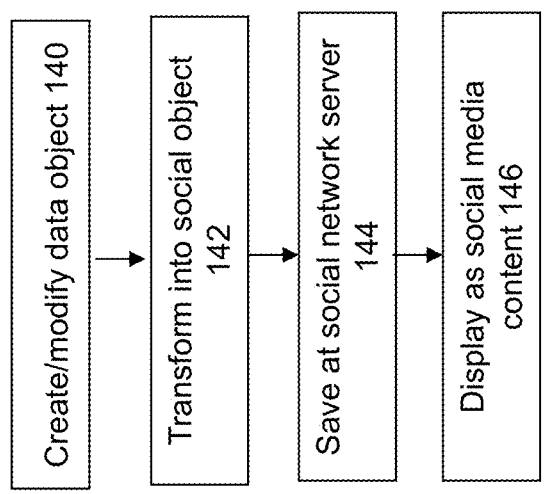
FIGS. 1B-1C depicts flowcharts of approaches to integrate an enterprise application with a social networking application.

FIG. 1B shows a flowchart of an approach to integrate an enterprise application with a social network application. At 140, a data object is created and/or modified in the enterprise application system (illustratively referred to herein with respect to a CRM system). Such objects may pertain to any data or information to be maintained in the CRM system. Examples of such objects comprise data pertaining to customers and/or opportunities. In some embodiments, the CRM data object corresponds to a business object and an associated system of record.

At 142, the CRM data object is transformed into a data object usable by a social network system. Any data from enterprise applications and business processes can potentially be socialized as a "social object." Social objects contain records from a business application or process (referred to as a "system of record") that are mapped as a visual and programmatic integration into the social network. For example, a sales opportunity from within a CRM enterprise application (e.g., the name of a sales prospect and related data for the sales prospect, such as the estimated probability that a sale will close, the expected revenue of the sale, etc.) is integrated into social network as a social object. As a result, social objects are explicitly coupled with conversations, where the social object can be discussed in context, and a record of that discussion can be retained for future viewing.

The social object may be generated for any business object of an application that users may desire to collaborate on over the social network. Examples of social objects include (1) an "Opportunity" social object from a CRM application; (2) a "Customer" social object from a CRM application; (3) a "Service Request" social object from a CRM application; (4) a "Business Process Shipment Escalation" social object from a business process application; (5) a "Portal" subject social object from a web portal application; (6) a "General Ledger Period Close" social object from a financial/ERP application; (7) an "Inventory Item" social object from an inventory/ERP application; and (8) an "Ordered Product" social object from a distributed order orchestration application (e.g., "Fusion Distributed Order Orchestration (DOO)" application from Oracle Corp.).

At 144, the social objects are stored within a social network system. At 144, then social objects are then displayed and/or acted upon as social network content within the social network system.

In some embodiments, a social object in social network pertains to one or more the following: (a) a set of programmatic rules defining the behavior of the integration and actions on receiving business events from the object within the system of record (i.e., the business object in the enterprise application); (b) a "wall" (i.e., a stream of posts) displaying publication of changes in the data set of the associated object from within the system of record and status posts from members/users of social network with appropriate access rights, where the wall provides an activity stream holding short, sometimes unrelated posts in which old information may scroll off the bottom of the list; the wall may differ from a conversation in which all content is related; (c) a set of related conversations or other social objects (e.g., a "Customer" social object can be related to multiple "Opportunity" social objects); (d) a membership potentially defined, controlled and managed by the system of record or open to sharing across the network with individuals and groups; and/or (e) a "gadget" storing data from the associated object within a system of record allowing quick access and updates to the original data set within the system of record (e.g., the revenue value of a CRM opportunity is displayed within a gadget and a member with access to the corresponding opportunity social object and the appropriate access rights within the system of record can update the revenue value in the system of record from the gadget tied to the social object within the social network).

Figure 1C:
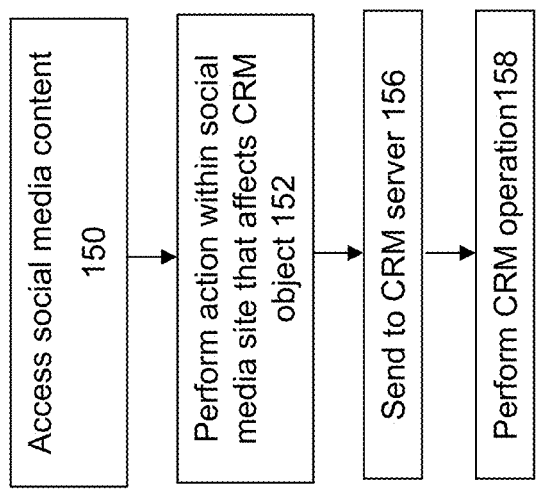

FIG. 1C illustrates a flowchart of an approach for integrating content from a social network to the enterprise application. At 150, social network content is accessed by a user on the social network system. The social network content pertains to a social object that corresponds to data within an enterprise application system.

At 152, the user performs an action within the social network system upon the social object, where the action pertains to a corresponding action that will be taken at the enterprise system. Such actions include, for example, updates to the social object that should be reflected for the business data at the enterprise application.

At 156, the appropriate web services call to implement the action is sent to the enterprise application system, e.g., using a connector mechanism as described in more detail below. At 158, the actions are taken at the enterprise application. These steps can be performed, for example, by sending the social network actions into web services calls that are implemented at the enterprise application server.

Figure 2:
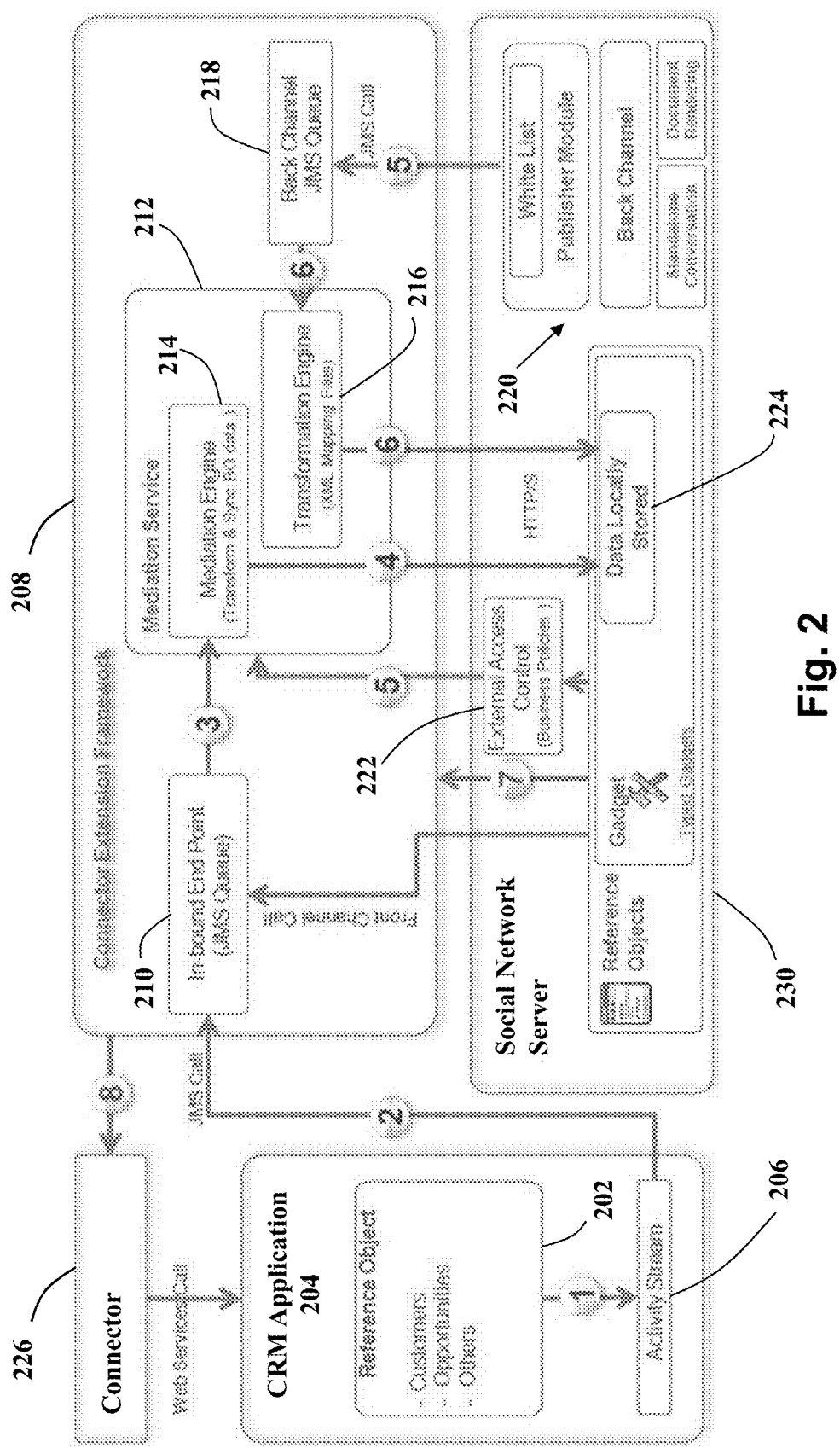
FIG. 2 illustrates an approach to integrate a CRM system with a social networking system.

FIG. 2 illustrates an example connector mechanism, process flow, and/or data flow that may be used to integrate a CRM application with a social network application. At (1), CRM data 202 pertaining to social objects managed and/or created by the CRM application 204 are pushed onto an activity stream 206. These objects 202 that are pushed onto the activity stream 206 pertain to "events" that are provided in a stream of such events to the connector framework 208. Any type of activity and/or event may suitably be provided to the social network application through the connector framework. For example, an operation that creates or modifies an object in the CRM application (e.g., creating or modifying an opportunity object) may result in an event that is to be transmitted to the social network application as represented as a social object. In some embodiments, the social objects correspond to business objects that are configured for use by or in conjunction with a social media application.

At (2), the events are picked up and are sent to the connector extension framework 208. In some embodiments, the events are sent to the connector framework 208 using one or more Java Message Service (JMS) calls. These are sent to an in-bound end point 210 (e.g., at a JMS queue). Calls can be made from the social network application to the in-bound end point 210, e.g., using a front channel call to add items to the JMS queue and/or to send signals to control the flow of data through the queue.

Next, at (3), the events are sent to a mediation service 212 that transforms the events into OSN actions. A set of mapping data is accessed by the mediation service 212 to perform the transformation functions. The mapping data (which may be referred to herein as a "connector specification") can be implemented as a set of one or more XML files containing details regarding mappings between events that occur on the CRM application and corresponding actions that should be taken at the social network application.

The mediation service 212 comprises a mediation engine 214 that transforms and synchronizes business object data. When a CRM event is received, the mediation engine 214 is responsible for identifying and implementing the specific actions that need to be taken at the social network application. The mapping data (e.g., in one or more XML mapping files) includes the requisite information that allows the mediation engine 214 to transform the CRM events into the appropriate actions at the social network application.

The mediation service 212 also comprises a transformation engine 216 that transforms CRM content into the appropriate social object. The mapping data (e.g., in the one or more XML mapping files) includes the requisite information that allows the transformation engine 216 to transform the CRM content into the appropriate content for the social network application, e.g., including for example but not limited to, mappings pertaining to translations, transformations, and/or formatting of the CRM content to match requirements for the social object content. For example, the syntax/attributes of the social object can be mapped to the syntax/attributes of the CRM event/object, so that data such as names and payload can be appropriately matched when being transformed.

Therefore, when an event is received for processing by the mediation service 212, then at (4), the social object events are transformed by the mediation engine 214 and then propagated to the social network server 230. Information is propagated to the social network server 230 from the mediation engine 214 regarding actions that should be taken to address the CRM event. The information may also include actions to be taken to create and/or modify a social object to contain the CRM content using the transformation engine 216.

For example, assume a CRM event pertains to creation of a new opportunity in the CRM application. This event would be transformed by the mediation engine 214 to include the appropriate actions to be taken to create a corresponding new social object at the social network server 230 and to store it into the local store 224. The transformation engine 216 would provide the specific details of the new social object, e.g., to include opportunity details as part of the social object and to add the user that created the CRM opportunity as a member of the wall for the social object. Once created, the instructions from the mediation engine 214 may also include the appropriate actions for the social network server 230 to address the new social object, e.g., to create a wall for new social object and post content from social object to the top of the wall. As noted above, the actions of the mediation engine 214 and the transformation engine 216 would be guided by one or more mapping files.

At (5), social network messages can be sent through a back-channel mechanism 218 (e.g., a back-channel JMS queue). For example, interface controls may be implemented in the social network application that can be embedded into another application (e.g., a "share" or "join" button), where the server 230 is configured to handle the inputs/parameters from the embedded interface element as a "back channel" event (as opposed to a "front-channel" event directly received from the CRM application), where the back channel event would be placed onto the queue 218 for processing. The mediation service 212 would handle the back-channel event pursuant to any appropriate configuration settings or mappings within its control metadata, e.g., to create/modify social objects, post items onto walls, etc.

Filtering may be implemented, e.g., which defines types of messages that should be put on the JMS back channel queue 218 (for example, filtered using a white list 220). A white list pertains to an access list, whereby items on the white list are allowed to pass through.

In addition, business policies are applied through an external access control mechanism 222. For example, business policies may be applied to add/remove users, make a conversation public/private, and/or add relate conversation.

At (6), security policies can also be defined through XML mapping files. This is performed in some embodiments by the transformation engine 216 within the mediation service mechanism 212. These rules are applied to data translation between incoming events and social objects in the social network server 230. The social objects are locally stored in storage location 224 in the social network server 230.

At (7), changes made on locally-stored social objects properties are sent to the connector framework 208. Thereafter, at (8), the connector framework 208 routes the call to the connector 226 that invokes the appropriate Web Services to create/send the actions generated from the social network server 230 into the CRM application 204. Different portions of the application stack in the enterprise application (e.g., for the CRM application) pertain to different business objects. The connector 226 is a component in the system that performs web services call to CRM application objects 202. In some embodiments, a different connector 226 is implemented for each different enterprise application, e.g., a first CRM connector for a CRM application, an ERP connector for an enterprise ERP application, and other connectors for other applications. In an alternate embodiment, the same connector is shared between multiple enterprise applications.

It is noted that the invention is not limited to the specific configuration of components shown in FIG. 2, and in fact, the functionality of the various components may be changed, combined, and/or separated without departure from the spirit of the invention. For example, the current embodiment illustrates the mediation service 212 as comprising a separate mediation engine 214 and a separate transformation engine 216. However, embodiments of the invention can be implemented where the functionality of the mediation service 212 is configured into any number one or more different engines and is thus not limited to the two engines 214 and 216 illustrated herein.

Figure 3:
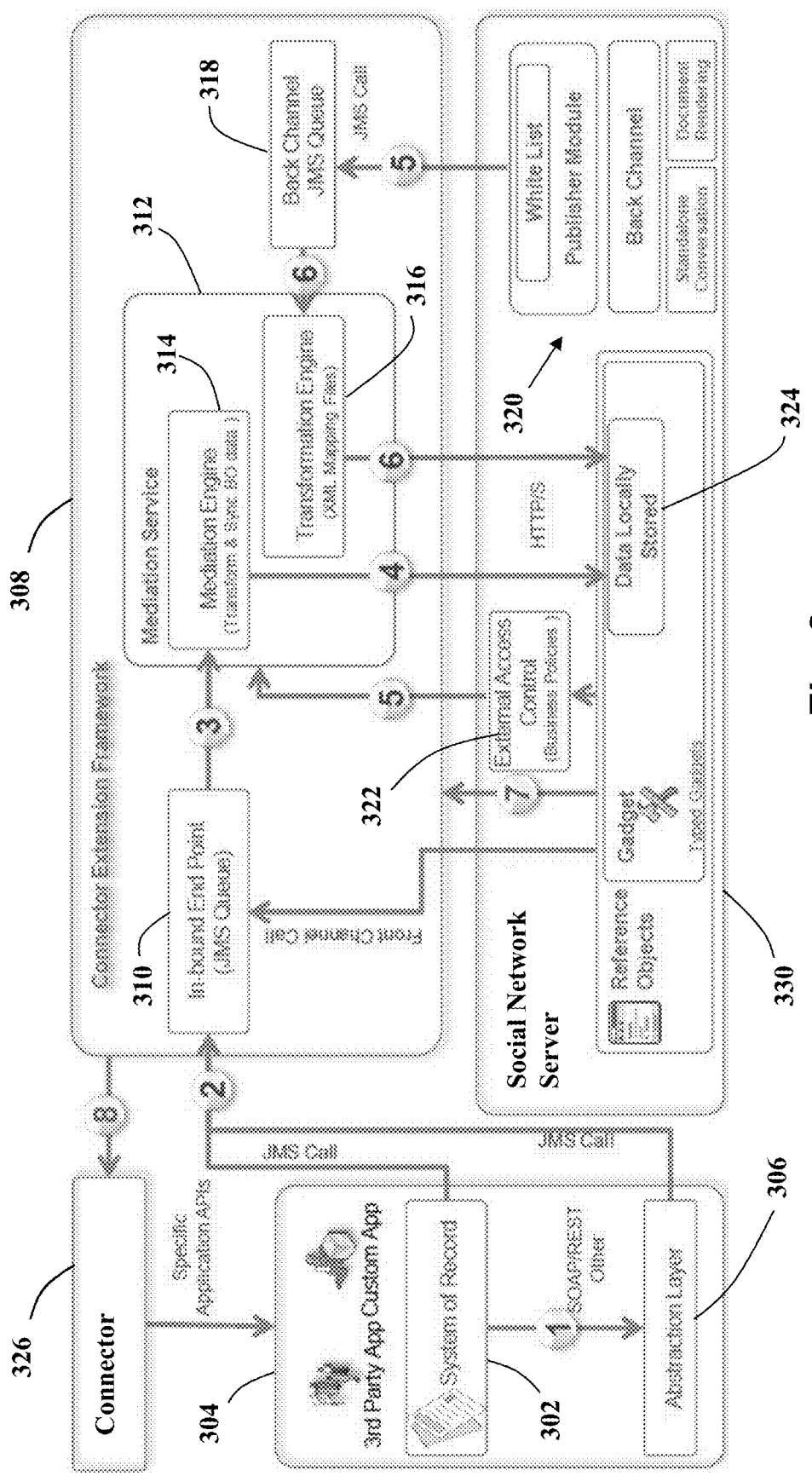
FIG. 3 illustrates an approach to integrate a custom application with a social networking system.

The present invention is not limited only to an enterprise application such as a CRM application. FIG. 3 illustrates an example approach (e.g., comprising connector mechanism, process flow, and/or data flow) that may be used to generally integrate a social network application with any other application, such as a $3^{rd}$ party custom application. At (1) a system of record events 302 is sent to an abstraction layer 306 (e.g., using a Simple Object Access Protocol (SOAP) call) to be converted into a JMS call. At (2) these events are picked up and/or directly sent through a JMS call to the in-bound end point 310 (e.g., JMS queue) at the connector extension framework 308. Thereafter, at (3) the events are sent to the mediation service 312 that transforms them into social network system actions. The social objects are locally stored at 324 in the social network server 330

At (4) the social object events are transformed to be propagated to the social network server, e.g., by using the mediation server 312 with its mediation engine 314 and transformation engine 316. At (5) the social network messages sent through the back channel mechanism are filtered by the white list 320 that defines type of message that should be put on the JMS back channel queue 318. In addition, business policies are applied through an external access control 322 (e.g., add/remove users, make a conversation public/private, add relate conversation).

At (6), security policies are defined in through XML mapping files. These rules are applied to data translation between incoming events and social objects in the social network server 330. At (7) changes made on locally-stored social object properties are sent to the connector framework 308. At (8) the connector framework 308 routes the call to a connector 326 that invokes the appropriate web services to create into the system of records 302 the actions generated from social network server 330. Specific application APIs (application programming interfaces) may also be used to implement the calls in the application 304.

The integration between the enterprise application and the social networking application enables smarter collaboration by securely and effectively connecting people and business information systems within enterprises and across enterprises—for example, with suppliers, partners and customers. This allows for the construction of smarter teams by connecting individuals and groups in real-time, allowing quick and spontaneous collaboration, while building extensive corporate knowledge to reproduce successful actions. Smarter collaboration leads to smarter teams, smarter decisions, and consistently better results.

One way that real-time communications is facilitated is by providing real-time "Conversations" using the social networking application. A conversation can drive discovery and discussion on any topic and amongst any group of people, enabling targeted and private communications. Conversations are modeled after how people interact in real life, making collaboration more natural and engaging and providing an efficient method of sharing information across the enterprise.

Figure 4:
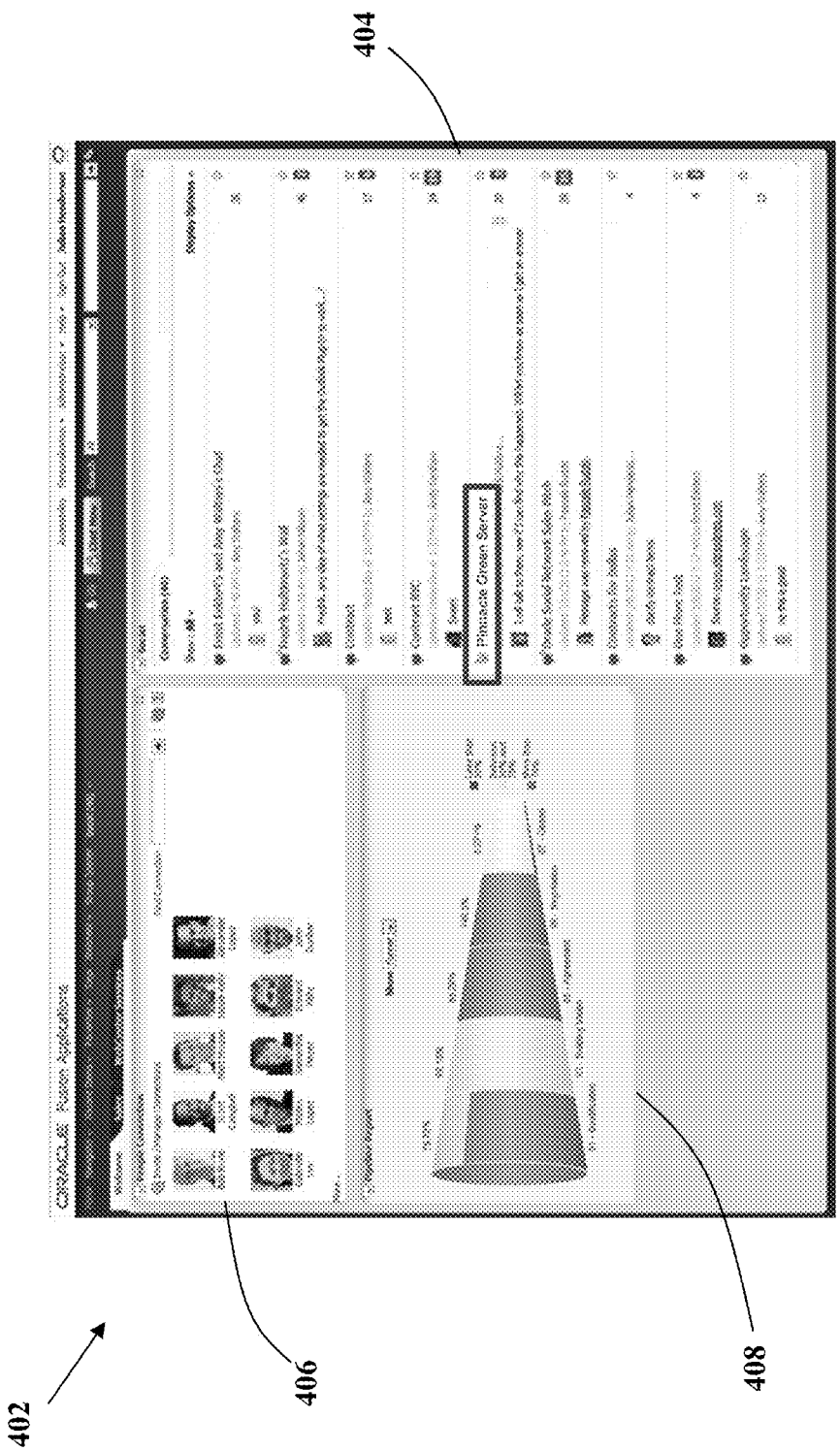
FIGS. 4-9 illustrate example interfaces that can be used to integrate an enterprise application with a social networking application

FIG. 4 illustrates an example welcome page 402 using a social networking application, in which a conversation list 404 is presented to a user. In some embodiments, the conversation list 404 can be configured to display information about the social objects, e.g., recent activities for the social objects. In addition, information about the user's conversations can be displayed, such as the recent activities for the user's conversations. Status updates can also be provided. Portions of the user interface 402 may also include an interface portion 406 pertaining to people connections and/or reports 408.

Filters may be provided to filter the information that is displayed. For example, filters may be used to filter for recent activities, unread content, follow-ups, specific social objects and/or favorites.

In addition, activity streams may be used to provide live streaming updates from across the enterprise, including recent activity, trending hot topics, and participants' status. Activities of interest can be filtered in a variety of ways such as recent and unread activities, as well as activities that require follow-up.

Figure 5:
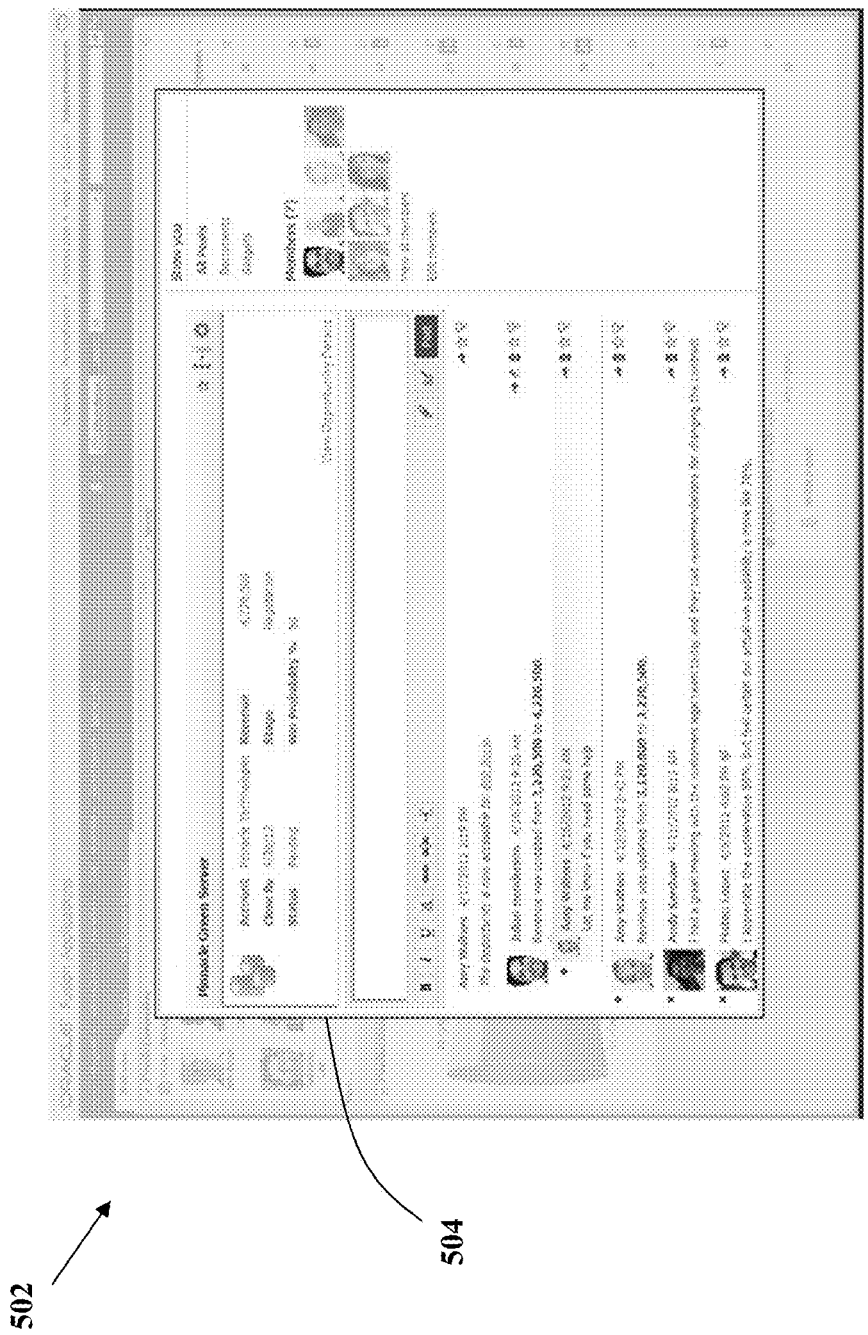

As illustrated in the interface page 502 of FIG. 5, social object pop-up windows 504 may be used to display data relating to social objects. For example, the social object pop up window 504 may be used to display social object attributes, a social object wall, filters, membership (e.g., clicking on member image brings up user profile wall on separate browser window), and/or a link to CRM business object wall.

Figure 6:
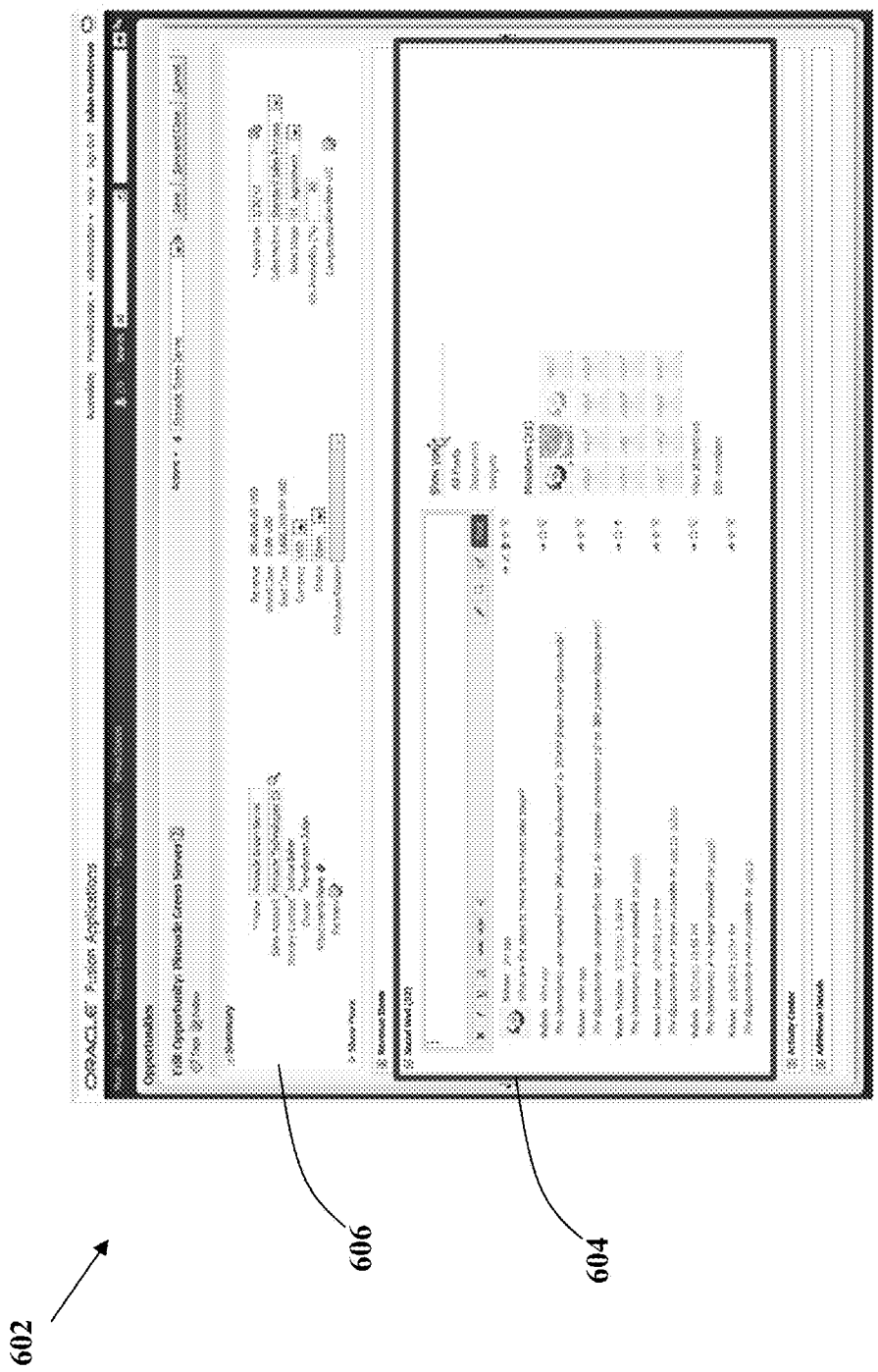

As illustrated in the interface 602 of FIG. 6, the social object window may be used to display information about the business object from the CRM application. This information may include, for example, details about the business object. In addition, a link may be provided to the business object details. Navigation may be provided to the business object detail page. FIG. 6 illustrates an example social object wall 604. The social object wall comprises filters that can be used to filter information on the wall. In addition, the wall can be configured to display membership information, such as member images where clicking on the member image brings up a user profile wall on separate browser window. The social object wall can be implemented, for example, as an embedded iFrame.

Figure 7:
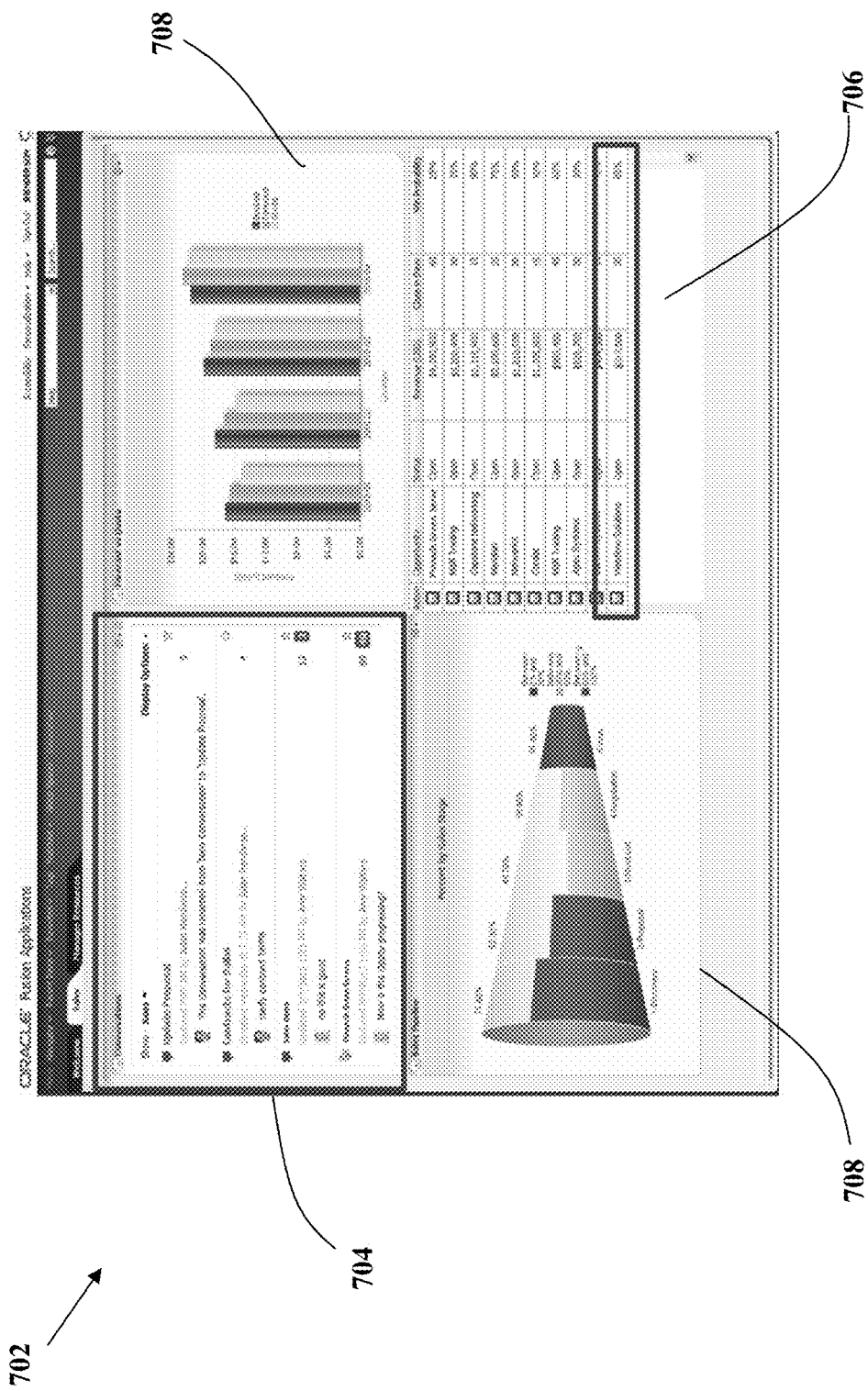

FIG. 7 illustrates an example dashboard UI 702 that integrates data from an enterprise application with data from a social networking application. The dashboard (e.g., a sales dashboard) includes information from the CRM application (such as UI elements (e.g., graphs and charts 708) and tables 706 of sales leads) along with information from a social networking application (such as a conversation list 704 pertaining to the sales leads).

Figure 8:
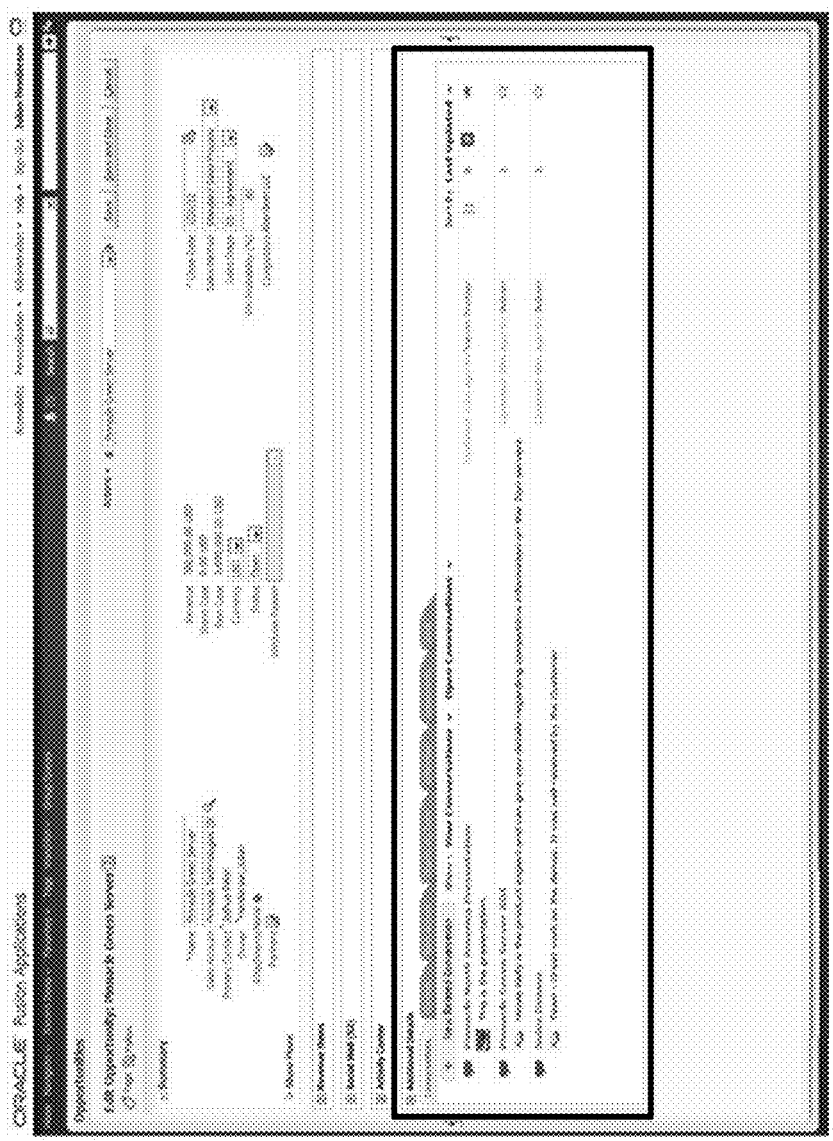
Figure 9:
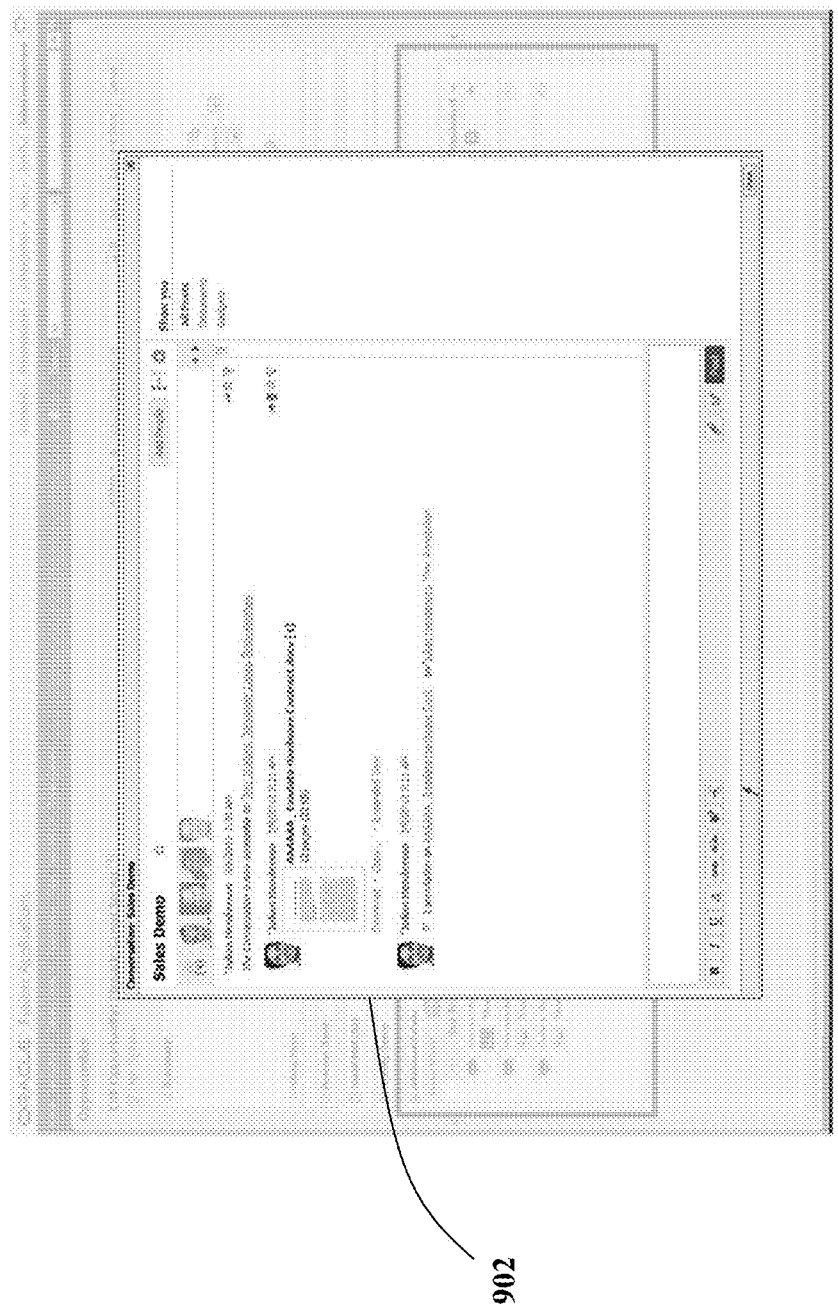

FIG. 8 illustrates an example of a business object detail page 802. In some embodiments, the business object detail page 802 provides a conversation list and a conversation pop up window, which is shown as 902 in FIG. 9. The conversation list can be embedded as tab or link (e.g., using iFrame). In addition, the conversation list provides a list of the pertinent social object related conversations, with details rendered in a pop-up window. The conversation pop-up window can be delivered as a browser pop-up window, e.g., where some or all of the conversation will be opened in new pop-up window. Filters may also be provided. The filters can be used, for example, to filter by either the user's own conversations or by the open conversations.

The integration of the CRM application and the social networking application may be implemented using an approach whereby from within the CRM application, the social networking application is separately launched to provide the social networking functionality. This is the approach in which the CRM data is exposed and exported to the social networking application to enable the social networking application to be launched with the correct set of content.

Alternatively, the social networking functionality may be invoked directly from within the CRM application. This approach permits the social networking functionality to be directly accessed from within the CRM application, e.g., by creating an iFrame with the social networking features, where the content for the iFrame is obtained for the CRM data.

Figure 10:
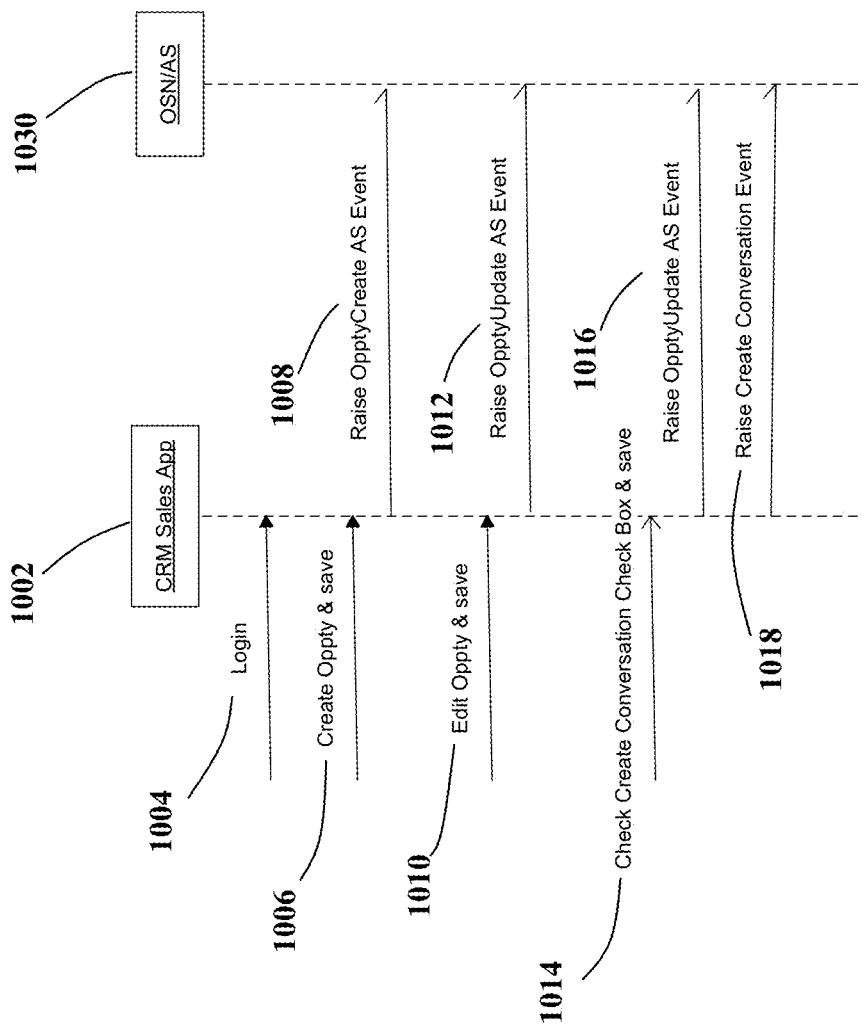
FIG. 10 shows a sequence diagram for creating/editing social networking objects based upon business objects.

FIG. 10 shows a sequence diagram for creating/editing social network (e.g., OSN) objects based upon business objects, e.g., CRM business objects. In some embodiments, this process can be used to integrate social network tools with CRM business objects, e.g., to create or engage in social networking and/or collaboration functionality for business objects, such as real-time conversation functionality.

The user initially logs in at 1004 into the CRM application 1002. When the control is given by the user to create an opportunity at 1006, the system raises a Create Opportunity event 1008 to the social network application 1030. When and/or if the user edits the opportunity at 1010, the system raises an Update Opportunity event 1012 to the social network application 1030.

As previously noted, when the user provides a control input to create an opportunity 1006, the system raises a Create Opportunity event 1008 for the social networking application. This creates a conversation in the social networking application 1030. In addition, the system may also raise an Update Opportunity event 1012 at that time.

When the user creates the social object, the user is added as a member of a social object wall. This allows the user to add other members to the wall, to engage in a social networking and collaborative activities. The system can be configured to add any set of individuals or groups to the social object wall. In some embodiments, only the user (or other individual) is added to the wall. However, the system can be configured to also, for example, add an entire team to the social object wall.

In some embodiments, a profile option is provided to control conversation functionality for the opportunity business object, where a check box interface is used in the opportunity edit page to control conversation creation. A user that has full access to the opportunity can control the interface to check the check box. For all other users, this check box will be shown in a disabled form. Once user checks the create conversation check box and hit save at 1014, an event is raised to create conversation at 1018. An event may also be raised to update the opportunity at 1016. In addition, once the user checks the check box, the checkbox is disabled with selection.

In some embodiments, a link is provided to view the conversation from the CRM application. In an alternate embodiment, the user is sent to the social networking application to view the conversation.

Therefore, what has been described is method, system, and program product for integrating one or more enterprise applications with a social networking application. This approach advantageously provides for real-time collaboration between individuals and teams within and across enterprises with a broad range of social tools that seamlessly integrate business processes, activities, and enterprise.

System Architecture Overview

Figure 11:
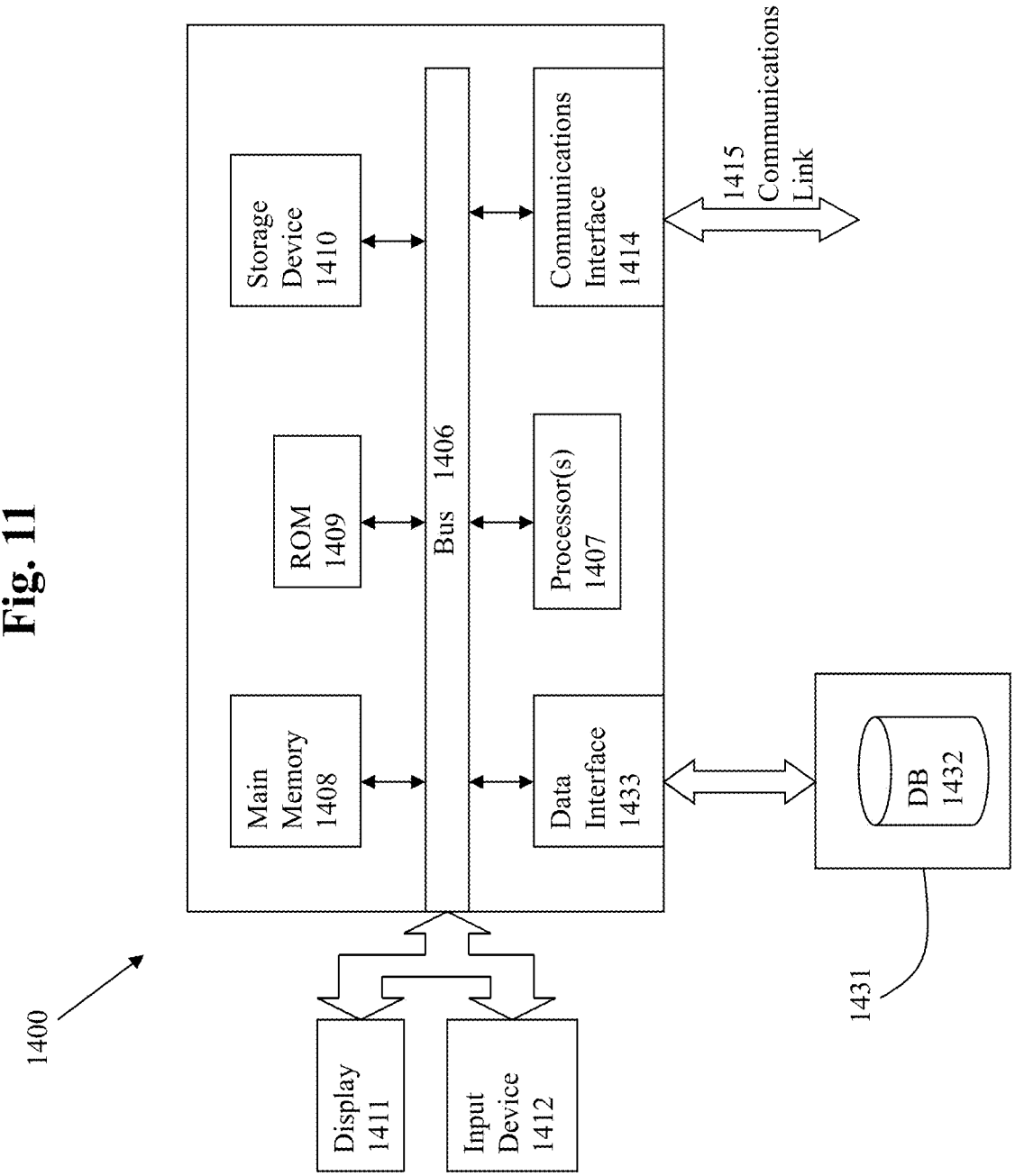
FIG. 11 shows an architecture of an example computing system with which the invention may be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408, e.g., which are carried to memory 1408 over bus 1406. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed in a database 1432 in storage device 1431 through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
maintaining an enterprise application;
maintaining a social networking application at a social networking server,
the social networking application facilitating user interactions and including at least user profiles, conversations, and social objects, and
a functionality of the social networking application invoked from within the enterprise application; and
integrating the enterprise application with the social networking application to provide for collaboration between users across the enterprise application and the social networking application by:
implementing a framework that comprises an in-bound message queue, a back-channel message queue, and a mediation service, wherein
the in-bound message queue receives, from an activity stream maintained by the enterprise application, business objects corresponding to events in the enterprise application, wherein the business objects pertains to social objects to be generated by the mediation service and received as part of one or more messages from the enterprise application, the social networking application transmits calls to the in-bound message queue over a front channel, the activity stream sends the business objects to the in-bound message queue of the framework using one or more java message service calls, an entry in the activity stream corresponds to creation or modification of at least one of the business object, and the calls to the in-bound message queue over the front channel add an item to the in-bound message queue and controlling a flow of data out of the in-bound message queue, the in-bound message queue comprising a java message service queue, and a transformation engine in the framework transforms enterprise application data into social networking application data and enforces security policies that are defined based at least in part upon one or more XML, mapping files,
the back-channel message queue receives other business objects from the enterprise application transmitted through the social networking application, wherein the back-channel message queue comprises a java message service call queue and receives first calls from the social networking server over a back-channel comprising back-channel messages, the back-channel message queue and the in-bound message queue are different queues, the social networking server filters the back-channel messages using a whitelist prior to transmission over the back-channel to the back-channel message queue, and whitelisted items are transmitted to be to the back-channel message queue and items that are not whitelisted are not transmitted to the back-channel message queue,
the mediation service receives business objects from the in-bound message queue and the back-channel message queue, the mediation service performs transformations of the business objects to social objects as specified by one or more mappings, and propagates social objects to the social networking application, the one or more mappings comprising translations, transformations, and formatting of business objects content to match requirements for social object content and specifying relationships between events that occur in the enterprise application and actions that occur in the social networking application, the actions comprising creation or modification of social objects that contain business object data, and at least some of the social objects are coupled with conversations, and implementing a connector between the framework and the enterprise application that initiates actions at the enterprise application in response to actions at the social networking application by transmitting web service calls to the enterprise application, actions at the social networking application comprising changes to social objects that correspond to business objects.

2. The method of claim 1, in which a social networking interface keeps a user informed of business activities using data from the enterprise application by generating social objects for business objects that a user desires to collaborate on such that users can collaborate on those posts in the social networking application.

3. The method of claim 2, wherein a social object window is used to display information about a business object from the enterprise application and in which communications associated with the business object are maintained at the social networking application for business objects that a user desires to collaborate on, such that users can collaborate on the business objects in the social networking application.

4. The method of claim 2, in which the social networking application comprises at least one of an activity stream, filter, social object popup, social object wall, dashboard interface, business object detail page, and links.

5. The method of claim 1, in which the social networking application can be called from within the enterprise application.

6. The method of claim 1, wherein the one or more messages comprise java message service calls and the in-bound message queue comprising a java message service queue.

7. The method of claim 6, in which business policies are implemented by the framework.

8. The method of claim 1, wherein
the one or more mappings are specified by one or more XML documents, and the XML documents further comprising policies received from an external access control mechanism on the social networking server, wherein the policies comprise adding users, removing users, setting a conversation to public, setting a conversation to private, adding related conversations, security rules,
the actions further comprise adding a user that created a respective event corresponding to a respective business object as a member of a respective wall for a corresponding social object,
a social networking interface keeps a user informed of business activities using data from the enterprise application by generating social objects for business objects that a user desires to collaborate on such that users can collaborate on those posts in the social networking application,
a social object window is used to display information about a business object from the enterprise application and in which communications associated with the business object are maintained at the social networking application for business objects that a user desires to collaborate on, such that users can collaborate on the business objects in the social networking application,
the social networking application comprises an activity stream, filter, social object popup, social object wall, dashboard interface, business object detail page, and links,
the social networking application can be called from within the enterprise application,
the one or more messages comprise java message service calls and the in-bound message queue comprising a java message service queue,
business policies are implemented by the framework, through an external access control mechanism, wherein the external access control mechanism allows for adding users, removing users, making conversations public or private, or adding a related conversation,
the framework further comprises a mediation engine that synchronizes business object data, and
further comprising:
generating a first business object in response to a first action of a first user action,
generating a first social object corresponding to the first business object, and
accessing the first social object at the social networking application by a second user and receiving a second action from the second user on the first social object at the social networking application, the second action results in a message to the enterprise application and an associated modification action on the business object.

9. A non-transitory computer readable medium having stored thereon a sequence of instructions which, when executed by a processor causes the processor to execute a set of acts comprising:
maintaining an enterprise application;
maintaining a social networking application at a social networking server,
the social networking application facilitating user interactions and including at least user profiles, conversations, and social objects, and
a functionality of the social networking application invoked from within the enterprise application; and
integrating the enterprise application with the social networking application to provide for collaboration between users across the enterprise application and the social networking application by:
implementing a framework that comprises an in-bound message queue, a back-channel message queue, and a mediation service, wherein
the in-bound message queue receives, from an activity stream maintained by the enterprise application, business objects corresponding to events in the enterprise application, wherein the business objects pertains to social objects to be generated by the mediation service and received as part of one or more messages from the enterprise application, the social networking application transmits calls to the in-bound message queue over a front channel, the activity stream sends the business objects to the in-bound message queue of the framework using one or more java message service calls, an entry in the activity stream corresponds to creation or modification of at least one of the business object, and the calls to the in-bound message queue over the front channel add an item to the in-bound message queue and controlling a flow of data out of the in-bound message queue, the in-bound message queue comprising a java message service queue, and a transformation engine in the framework transforms enterprise application data into social networking application data and enforces security policies that are defined based at least in part upon one or more XML, mapping files, the back-channel message queue receives other business objects from the enterprise application transmitted through the social networking application, wherein the back-channel message queue comprises a java message service call queue and receives first calls from the social networking server over a back-channel comprising back-channel messages, the back-channel message queue and the in-bound message queue are different queues, the social networking server filters the back-channel messages using a whitelist prior to transmission over the back-channel to the back-channel message queue, and whitelisted items are transmitted to be to the back-channel message queue and items that are not whitelisted are not transmitted to the back-channel message queue, the mediation service receives business objects from the in-bound message queue and the back-channel message queue, the mediation service performs transformations of the business objects to social objects as specified by one or more mappings, and propagates social objects to the social networking application, the one or more mappings comprising translations, transformations, and formatting of business objects content to match requirements for social object content and specifying relationships between events that occur in the enterprise application and actions that occur in the social networking application, the actions comprising creation or modification of social objects that contain business object data, and at least some of the social objects are coupled with conversations, and implementing a connector between the framework and the enterprise application that initiates actions at the enterprise application in response to actions at the social networking application by transmitting web service calls to the enterprise application, actions at the social networking application comprising changes to social objects that correspond to business objects.

10. The computer readable medium of claim 9, in which a social networking interface keeps a user informed of business activities using data from the enterprise application by generating social objects for business objects that a user desires to collaborate on such that users can collaborate on those posts in the social networking application.

11. The computer readable medium of claim 10, wherein a social object window is used to display information about a business object from the enterprise application and in which communications associated with the business object are maintained at the social networking application for business objects that a user desires to collaborate on, such that users can collaborate on the business objects in the social networking application.

12. The computer readable medium of claim 10, in which the social networking application comprises at least one of an activity stream, filter, social object pop-up, social object wall, dashboard interface, business object detail page, and links.

13. The computer readable medium of claim 9, in which the social networking application can be called from within the enterprise application.

14. The computer readable medium of claim 9, wherein the one or more messages comprise java message service calls and the in-bound message queue comprising a java message service queue.

15. The computer readable medium of claim 14, in which business policies are implemented by the framework.

16. The computer readable medium of claim 9, wherein
the one or more mappings are specified by one or more XML documents, and the XML documents further comprising policies received from an external access control mechanism on the social networking server, wherein the policies comprise adding users, removing users, setting a conversation to public, setting a conversation to private, adding related conversations, security rules, the actions further comprise adding a user that created a respective event corresponding to a respective business object as a member of a respective wall for a corresponding social object, a social networking interface keeps a user informed of business activities using data from the enterprise application by generating social objects for business objects that a user desires to collaborate on such that users can collaborate on those posts in the social networking application, a social object window is used to display information about a business object from the enterprise application and in which communications associated with the business object are maintained at the social networking application for business objects that a user desires to collaborate on, such that users can collaborate on the business objects in the social networking application, the social networking application comprises an activity stream, filter, social object popup, social object wall, dashboard interface, business object detail page, and links, the social networking application can be called from within the enterprise application, the one or more messages comprise java message service calls and the in-bound message queue comprising a java message service queue, business policies are implemented by the framework, through an external access control mechanism, wherein the external access control mechanism allows for adding users, removing users, making conversations public or private, or adding a related conversation, the framework further comprises a mediation engine that synchronizes business object data, and the set of acts further comprising:
generating a first business object in response to a first action of a first user action,
generating a first social object corresponding to the first business object, and
accessing the first social object at the social networking application by a second user and receiving a second action from the second user on the first social object at the social networking application, the second action results in a message to the enterprise application and an associated modification action on the business object.

17. A system, comprising:
a processor;
a memory comprising computer code executed using the processor, in which the computer code when executed implements:
maintaining an enterprise application;

maintaining a social networking application at a social networking server,
the social networking application facilitating user interactions and including at least user profiles, conversations, and social objects, and
a functionality of the social networking application invoked from within the enterprise application; and
integrating the enterprise application with the social networking application to provide for collaboration between users across the enterprise application and the social networking application by:
implementing a framework that comprises an in-bound message queue, a back-channel message queue, and a mediation service, wherein
the in-bound message queue receives, from an activity stream maintained by the enterprise application, business objects corresponding to events in the enterprise application, wherein the business objects pertains to social objects to be generated by the mediation service and received as part of one or more messages from the enterprise application, the social networking application transmits calls to the in-bound message queue over a front channel, the activity stream sends the business objects to the in-bound message queue of the framework using one or more java message service calls, an entry in the activity stream corresponds to creation or modification of at least one of the business object, and the calls to the in-bound message queue over the front channel add an item to the in-bound message queue and controlling a flow of data out of the in-bound message queue, the in-bound message queue comprising a java message service queue, and a transformation engine in the framework transforms enterprise application data into social networking application data and enforces security policies that are defined based at least in part upon one or more XML, mapping files,
the back-channel message queue receives other business objects from the enterprise application transmitted through the social networking application, wherein the back-channel message queue comprises a java message service call queue and receives first calls from the social networking server over a back-channel comprising back-channel messages, the back-channel message queue and the in-bound message queue are different queues, the social networking server filters the back-channel messages using a whitelist prior to transmission over the back-channel to the back-channel message queue, and whitelisted items are transmitted to be to the back-channel message queue and items that are not whitelisted are not transmitted to the back-channel message queue
the mediation service receives business objects from the in-bound message queue and the back-channel message queue, the mediation service performs transformations of the business objects to social objects as specified by one or more mappings, and propagates social objects to the social networking application, the one or more mappings comprising translations, transformations, and formatting of business objects content to match requirements for social object content and specifying relationships between events that occur in the enterprise application and actions that occur in the social networking application, the actions comprising creation or modification of social objects that contain business object data, and at least some of the social objects are coupled with conversations, and
implementing a connector between the framework and the enterprise application that initiates actions at the enterprise application in response to actions at the social networking application by transmitting web service calls to the enterprise application, actions at the social networking application comprising changes to social objects that correspond to business objects.

18. The system of claim 17, in which a social networking interface keeps a user informed of business activities using data from the enterprise application by generating social objects for business objects that a user desires to collaborate on such that users can collaborate on those posts in the social networking application.

19. The system of claim 18, wherein a social object window is used to display information about a business object from the enterprise application and in which communications associated with the business object are maintained at the social networking application for business objects that a user desires to collaborate on, such that users can collaborate on the business objects in the social networking application.

20. The system of claim 18, in which the social networking application comprises at least one of an activity stream, filter, social object pop-up, social object wall, dashboard interface, business object detail page, and links.

21. The system of claim 17, in which the social networking application can be called from within the enterprise application.

22. The system of claim 17, in which a connector extension framework integrates the enterprise application with the social networking application, wherein data is transformed between the enterprise application and the social networking application.

23. The system of claim 22, wherein the one or more messages comprise java message service calls and the in-bound message queue comprising a java message service queue.

24. The system of claim 22, in which business policies are implemented by the connector extension framework.

25. The system of claim 17, wherein
the one or more mappings are specified by one or more XML documents, and the XML documents further comprising policies received from an external access control mechanism on the social networking server, wherein the policies comprise adding users, removing users, setting a conversation to public, setting a conversation to private, adding related conversations, security rules,
the actions further comprise adding a user that created a respective event corresponding to a respective business object as a member of a respective wall for a corresponding social object,
a social networking interface keeps a user informed of business activities using data from the enterprise application by generating social objects for business objects that a user desires to collaborate on such that users can collaborate on those posts in the social networking application, a social object window is used to display information about a business object from the enterprise application and in which communications associated with the business object are maintained at the social networking application for business objects that a user desires to collaborate on, such that users can collaborate on the business objects in the social networking application, the social networking application comprises an activity stream, filter, social object popup, social object wall, dashboard interface, business object detail page, and links, the social networking application can be called from within the enterprise application, the one or more messages comprise java message service calls and the in-bound message queue comprising a java message service queue, business policies are implemented by the framework, through an external access control mechanism, wherein the external access control mechanism allows for adding users, removing users, making conversations public or private, or adding a related conversation, the framework further comprises a mediation engine that synchronizes business object data, and the computer code, when executed, further implements:
generating a first business object in response to a first action of a first user action,
generating a first social object corresponding to the first business object, and
accessing the first social object at the social networking application by a second user and receiving a second action from the second user on the first social object at the social networking application, the second action results in a message to the enterprise application and an associated modification action on the business object.

* * * * *

UNITED STATES PATENT AND TRADEMARK OFFICE
CERTIFICATE OF CORRECTION

PATENT NO. : 10,672,084 B2
APPLICATION NO. : 13/888888
DATED : June 2, 2020
INVENTOR(S) : Salzer et al.

It is certified that error appears in the above-identified patent and that said Letters Patent is hereby corrected as shown below:

In the Drawings

On sheet 3 of 13, in Fig. 1C, Line 7, delete "operation158" and insert -- operation 158 --, therefor.

In the Specification

In Column 2, Line 3, after "application" insert -- . --.

In Column 3, Line 33, delete "and or" and insert -- and/or --, therefor.

In Column 11, Line 39, delete "PTSN," and insert -- PSTN, --, therefor.

In the Claims

In Column 12, Line 36, in Claim 1, delete "XML," and insert -- XML --, therefor.

In Column 12, Line 51, in Claim 1, delete "to be to the" and insert -- to the --, therefor.

In Column 15, Line 2, in Claim 9, delete "XML," and insert -- XML --, therefor.

In Column 15, Line 18, in Claim 9, delete "to be to the" and insert -- to the --, therefor.

In Column 17, Line 41, in Claim 17, delete "XML," and insert -- XML --, therefor.

In Column 17, Lines 55-56, in Claim 17, delete "to be to the" and insert -- to the --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*